(12) United States Patent
Wang et al.

(10) Patent No.: US 11,784,579 B2
(45) Date of Patent: Oct. 10, 2023

(54) DEVICES, SYSTEMS, AND METHODS FOR POWER SUPPLIES

(71) Applicant: Flex Ltd., Singapore (SG)

(72) Inventors: Vifor Wang, ShenZhen (CN); Steven Shen, ShenZhen (CN); Baoming Mei, ShenZhen (CN); Huamin Xu, ShenZhen (CN)

(73) Assignee: Flex Ltd., Singapore (SG)

( * ) Notice: Subject to any disclaimer, the term of this patent is extended or adjusted under 35 U.S.C. 154(b) by 0 days.

(21) Appl. No.: 17/369,538

(22) Filed: Jul. 7, 2021

(65) Prior Publication Data
US 2022/0021300 A1 Jan. 20, 2022

(51) Int. Cl.
*H02M 7/219* (2006.01)
*H02M 1/08* (2006.01)
*H02M 1/38* (2007.01)

(52) U.S. Cl.
CPC .......... *H02M 7/2195* (2021.05); *H02M 1/083* (2013.01); *H02M 1/38* (2013.01)

(58) Field of Classification Search
CPC ....... H02M 7/2195; H02M 1/38; H02M 1/083
See application file for complete search history.

(56) References Cited

U.S. PATENT DOCUMENTS

| 8,045,350 | B2 | 10/2011 | Sells |
| 2009/0273959 | A1 | 11/2009 | Sells |
| 2021/0111639 | A1* | 4/2021 | Lai ................. H02M 1/08 |

* cited by examiner

*Primary Examiner* — Jue Zhang
(74) *Attorney, Agent, or Firm* — Sheridan Ross P.C.

(57) ABSTRACT

A rectifier includes a first input and a second input that receive an unrectified signal, a first circuit portion including a first transistor coupled to the second input, a second circuit portion including a second transistor coupled to the first input, a third circuit portion including a third transistor coupled to the first input, a fourth circuit portion including a fourth transistor coupled to the second input. The first, second, third, and fourth circuit portions are operable to convert the unrectified signal into a rectified signal. The rectifier includes a first adjustment circuit coupled to a gate of the third transistor, and a second adjustment circuit coupled to a gate of the fourth transistor. The first adjustment circuit and the second adjustment circuit are configured to control a dead time between an on-state of the third transistor and an on-state of the fourth transistor.

18 Claims, 6 Drawing Sheets

DEVICES, SYSTEMS, AND METHODS FOR POWER SUPPLIES

CROSS REFERENCE TO RELATED APPLICATIONS

This application claims priority under 35 U.S.C. § 119 to Chinese Application No. 202010673035.7 filed on Jul. 14, 2020, the disclosure of which is hereby incorporated by reference, in its entirety, for all that it teaches and for all purposes.

FIELD

The present disclosure is generally directed to devices, systems, and methods for power supplies, in particular, power supplies that convert alternating current (AC) signals to direct current (DC) signals.

BACKGROUND

Many modern devices utilize power supplies that convert an AC input signal into a DC output signal for supplying power to the device or other load. A power supply may include a rectifier circuit that performs the conversion using diode bridges and/or actively controlled switches. Characteristics that drive the design of a rectifier circuit include conversion efficiency, reliability, generated interference (e.g., electromagnetic interference (EMI)), and the like.

SUMMARY

At least one example embodiment is directed to a rectifier including a first input and a second input that receive an unrectified signal, a first circuit portion including a first transistor coupled to the second input, a second circuit portion including a second transistor coupled to the first input, a third circuit portion including a third transistor coupled to the first input, a fourth circuit portion including a fourth transistor coupled to the second input. The first, second, third, and fourth circuit portions are operable to convert the unrectified signal into a rectified signal. the rectifier includes a first adjustment circuit coupled to a gate of the third transistor, and a second adjustment circuit coupled to a gate of the fourth transistor. The first adjustment circuit and the second adjustment circuit are configured to control a dead time between an on-state of the third transistor and an on-state of the fourth transistor.

At least one example embodiment is directed to a load, and a power supply that supplies power to the load and including a rectifier. The rectifier includes a first input and a second input that receive an unrectified signal, a first circuit portion including a first transistor coupled to the second input, a second circuit portion including a second transistor coupled to the first input, a third circuit portion including a third transistor coupled to the first input, a fourth circuit portion including a fourth transistor coupled to the second input. The first, second, third, and fourth circuit portions are operable to convert the unrectified signal into a rectified signal. The rectifier includes a first adjustment circuit coupled to a gate of the third transistor, and a second adjustment circuit coupled to a gate of the fourth transistor. The first adjustment circuit and the second adjustment circuit are configured to control a dead time between an on-state of the third transistor and an on-state of the fourth transistor.

At least one example embodiment is directed to a system including a source that generates an alternating current (AC) signal, a load, and a power supply that supplies power to the load with a direct current (DC) signal. The power supply includes a rectifier. The rectifier includes a first input and a second input that receive the AC signal, a first circuit portion including a first transistor coupled to the second input, a second circuit portion including a second transistor coupled to the first input, a third circuit portion including a third transistor coupled to the first input, a fourth circuit portion including a fourth transistor coupled to the second input. The first, second, third, and fourth circuit portions are operable to convert the AC signal into the DC signal, a first adjustment circuit coupled to a gate of the third transistor, and a second adjustment circuit coupled to a gate of the fourth transistor. The first adjustment circuit and the second adjustment circuit are configured to control a dead time between an on-state of the third transistor and an on-state of the fourth transistor.

DETAILED DESCRIPTION

Related art power supplies with rectifiers experience difficulty with obtaining high efficiency along with high reliability because improved efficiency often sacrifices reliability and improved reliability often sacrifices efficiency. Inventive concepts are directed to power supplies including rectifier circuits having cost-effective components that maintain high efficiency and high reliability, and/or reduce or eliminate total harmonic current distortion (iTHD) and/or EMI.

Figure 1:
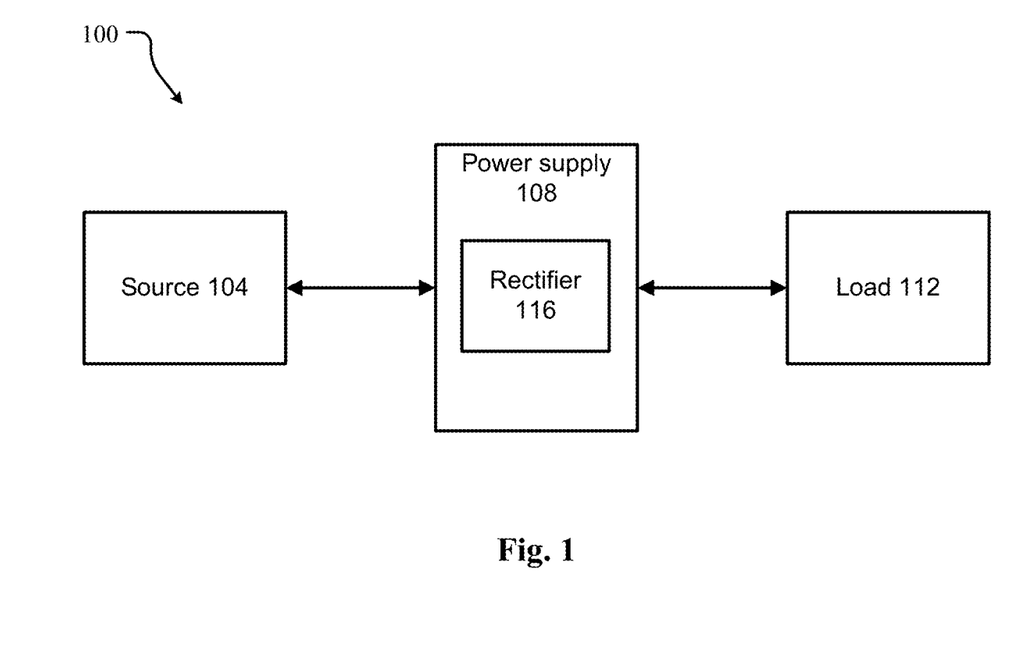
FIG. 1 illustrates a block diagram of a system according to at least one example embodiment.

FIG. 1 illustrates a system 100 according to at least one example embodiment. The system 100 includes a source 104, a power supply 108, and a load 112. The source 104 may be a power source that generates AC power signals. One example of the source 104 is a traditional North American power outlet that produces 110V-120V at 60 Hz. However, example embodiments are not limited thereto, and the source 104 may include any AC signal generator that generates signals at any desired voltage and frequency.

The power supply 108 may include a rectifier 116 for converting the AC signal from the source 104 into a DC signal for powering the load 112. The rectifier 116 may perform single-phase, full wave rectification, for example. The structure and effects of the rectifier 116 are discussed in more detail below with reference to FIGS. 2-6. The power supply 108 may be a smart power supply that includes the ability to be controlled remotely using wireless signals (e.g., Wi-Fi).

The load 112 may include any device powered and/or charged by a DC signal from the power supply 108. Examples of the load 112 include a personal computer, components within a personal computer, a server, components within a server, a smartphone, components within a smartphone, a tablet, components within a tablet, manufacturing equipment, and/or the like.

Although the source 104, the power supply 108, and the load 112 are illustrated as separate elements of the system 100, one or more of these elements may be integrated with one another according to design preferences. For example, the power supply 108 may be integrated with the load 112. In another example, the power supply 108 may be integrated with the source 104.

Although not explicitly shown, it should be appreciated that the source 104, the power supply 108, and/or the load 112 may include a memory or memories and a processor or processors to carry out other functions of each depicted element that are not necessarily the focus of this application. The memory may be a computer readable medium including instructions that are executable by the processor. The memory may include any type of computer memory device, and may be volatile or non-volatile in nature. In some embodiments, the memory may include a plurality of different memory devices. Non-limiting examples of memory include Random Access Memory (RAM), Read Only Memory (ROM), flash memory, Electronically-Erasable Programmable ROM (EEPROM), Dynamic RAM (DRAM), etc. The memory may include instructions that enable the processor to control various functions and to store data. The memory may be local (e.g., integrated with) the processor and/or separate from the processor. The processor may correspond to one or many computer processing devices. For instance, the processor may be provided as a Field Programmable Gate Array (FPGA), an Application-Specific Integrated Circuit (ASIC), any other type of Integrated Circuit (IC) chip, a collection of IC chips, a microcontroller, a collection of microcontrollers, or the like. As a more specific example, the processor may be provided as a microprocessor, Central Processing Unit (CPU), or plurality of microprocessors that are configured to execute the instructions sets stored in memory. The processor enables various functions upon executing the instructions stored in memory.

It should be further appreciated that one or more elements in the system 100 may include one or more communication interfaces that enable communication with other elements in the system 100. These communication interfaces include wired and/or wireless communication interfaces for exchanging data and control signals between one another. Examples of wired communication interfaces/connections include Ethernet connections, HDMI connections, connections that adhere to PCI/PCIe standards and SATA standards, and/or the like. Examples of wireless interfaces/connections include Wi-Fi connections, LTE connections, Bluetooth connections, NFC connections, and/or the like.

Inventive concepts related to designs for the rectifier 116 are described below with reference to FIGS. 2-4. Although the discussion of FIGS. 2-4 may not include specific descriptions for the functionality of every circuit element (e.g., transistors, resistors, capacitors, diodes, etc.) depicted therein, one of ordinary skill in the art may readily deduce the functions of each of the depicted circuit elements based on connections to other circuit elements (e.g., one of ordinary skill in the art would know that capacitor C1 is a smoothing capacitor given its connection within the schematics). In addition, the discussion of FIGS. 2-4 may omit specific descriptions for connections between circuit elements (e.g., an anode of a diode connected to a gate of transistor), but such connections should also be readily recognizable to one of ordinary skill in the art using the illustrated symbols for each circuit element.

Figure 2:
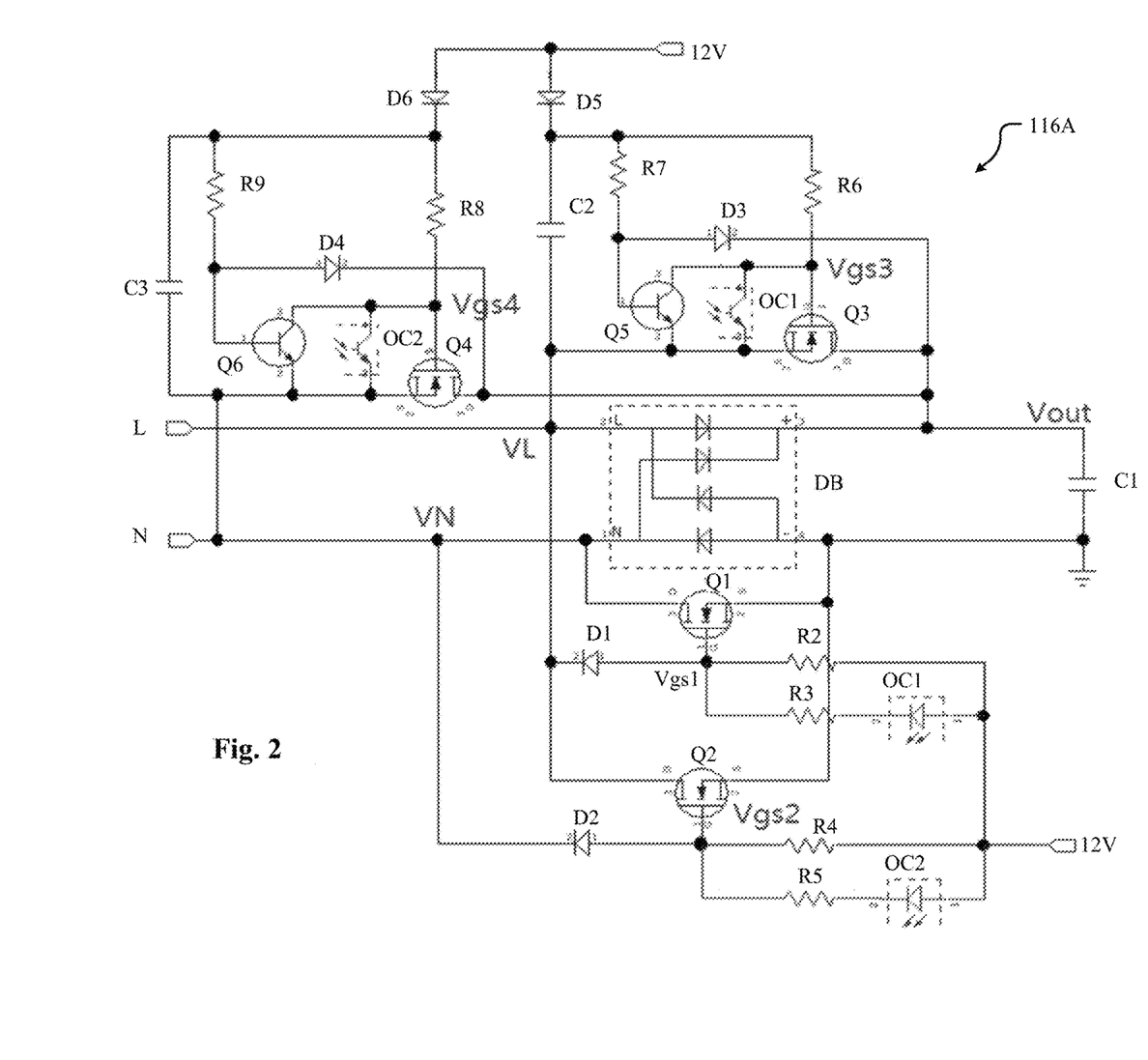
FIG. 2 illustrates a schematic with example circuitry for the rectifier in FIG. 1 according to at least one example embodiment.

FIG. 2 illustrates a schematic with example circuitry for the rectifier 116 in FIG. 1 according to at least one example embodiment. As shown in FIG. 2, the rectifier 116A includes first and second inputs L and N, a diode bridge DB, switches Q1, Q2, Q3, and Q4, and an output Vout. In general, the inputs L/N are connected to the source 104 and the output Vout is connected to the load 112. The diode bridge DB and the switches Q1 to Q4 are connected in a bridge rectifier configuration. FIG. 2 further illustrates resistors or resistances R2 to R9, diodes D1 to D6, capacitors or capacitances C1 to C3, and switches Q5 and Q6. According to at least one example embodiment, switches Q5 and Q6 are bipolar junction transistors (BJTs), and switches Q1 to Q4 are MOSFETs. However, example embodiments are not limited thereto, and other switching devices may be used according to design preferences.

FIG. 2 further illustrates a first adjustment circuit coupled to a gate of the third transistor Q3, and a second adjustment circuit coupled to a gate of the fourth transistor Q4. The first adjustment circuit and the second adjustment circuit control a dead time between a gate-source voltage Vgs3 and a gate-source voltage Vgs4 and are described in more detail below with reference to optocouplers OC1 and OC2.

In operation, the switches Q1 to Q4 switch on and off to rectify an unrectified signal (AC signal) input to a first input L and a second input N to output a rectified signal (DC signal) at the output Vout. The first input L may be coupled to a live terminal of the source 104 while the second input N may be coupled to a neutral terminal of the source 104. Although not explicitly shown, the rectifier 116 and/or power supply 108 may include a third terminal connected to earth ground. As shown, each transistor Q1 to Q4 has a respective gate-source voltage Vgs1 to Vgs4. The threshold voltage of each transistor Q1 to Q4 is the gate-source voltage at which the transistor turns on.

As shown in FIG. 2, a first circuit portion includes a first transistor Q1 coupled to the second input N. For example, a drain of the transistor Q1 is coupled to the second input N. The first circuit portion may further include resistor R2 and diode D1 connected as shown. A second circuit portion may include a second transistor Q2 coupled to the first input L. For example, a drain of the second transistor Q2 is coupled to the first input L. The second circuit portion may include the resistor R4 and the diode D2 connected as shown. FIG. 2 further illustrates a third circuit portion including a third transistor Q3 coupled to the first input L. For example, a source of the third transistor Q3 is coupled to the first input L. The third circuit portion may further include transistor Q5, resistors R6 and R7, capacitor C2, and diodes D3 and D5. A fourth circuit portion includes a fourth transistor Q4 coupled to the second input N. The fourth circuit portion may further include transistor Q6, resistors R8 and R9, capacitor C3, and diodes D4 and D6. The first, second, third, and fourth circuit portions operate to convert an unrectified signal at inputs L and N into a rectified signal at output Vout.

As noted above, FIG. 2 further illustrates the first adjustment circuit coupled to a gate of the third transistor Q3, and the second adjustment circuit coupled to a gate of the fourth transistor Q4. According to inventive concepts, the first adjustment circuit and the second adjustment circuit are configured to control a dead time between an on-state of the third transistor Q3 and an on-state of the fourth transistor Q4.

In FIG. 2, the first adjustment circuit includes a first optocoupler OC1 including a first light emitting portion coupled to the first transistor Q1 and a first light receiving portion coupled to the third transistor Q3. The first adjustment circuit may further include the resistor R3 coupled to the first transistor Q1. The second adjustment circuit includes a second optocoupler OC2 including a second light emitting portion coupled to the second transistor Q2 and a second light receiving portion coupled to the fourth transistor Q4. The second adjustment circuit may further include resistor R5 coupled to the second transistor Q2. As is known in the art, optocouplers OC1 and OC2 transfer electrical signals between two isolated circuits using light. Thus, the light emitting portions of the optocouplers OC1 and OC2 may include a light emitting diode (LED) for emitting light and the light receiving portions may include a phototransistor, photodiode, photoresistor, or other light sensor for detecting light from a respective light emitting portion. The LED may emit near-infrared or infrared light. The light emitting portions of optical couplers OC1 and OC2 may emit light through a medium that is detected by the light receiving portions, where the medium comprises a dielectric material.

As shown in FIG. 2, the rectifier 116A includes power supply lines coupled to the optocouplers OC1 and OC2 and diodes D5 and D6. The power supply lines may receive a power supply signal, for example, a 12V DC signal to provide power for operating the optocouplers OC1 and OC2 and the switches Q1 to Q6. For example, the first light emitting portion of optocoupler OC1 is coupled between a power supply node that receives the power supply signal and a gate of the first transistor Q1, and the first light receiving portion of optocoupler OC1 is coupled between the first input L and the gate of the third transistor Q3.

The second light emitting portion of optocoupler OC2 is coupled between the power supply node and a gate of the second transistor Q2, and the second light receiving portion of the second optocoupler OC2 is coupled between the second input N and the gate of the fourth transistor Q4. In addition, the first light receiving portion of optocoupler OC1 is coupled to a source of the third transistor Q3, and the second light receiving portion of optocoupler OC2 is coupled to a source of the fourth transistor Q4.

Here, it should be appreciated that optocouplers OC1 and OC2 are used to control the dead time between on-states of the third and fourth transistors Q3 and Q4. For example, when Vgs1 is pulled down by the voltage at node VL, control current passes through optocoupler OC1 and Vgs3 is pulled down. On the other hand, when Vgs2 is pulled by down the voltage at node VN, control current passes through optocoupler OC2 and Vgs4 is pulled down (see FIG. 5, for example). In general, the characteristics of the optocouplers OC1 and OC2 and/or the values of resistors R3 and R5 are selected so as to achieve a desired dead time between the on-state of transistors Q3 and Q4. These characteristics may include light intensity of the light emitting portions, sensitivity of the light receiving portions, materials used for the dielectric, a thickness of the dielectric between the light emitting and light receiving portions, and/or the like.

Figure 3:
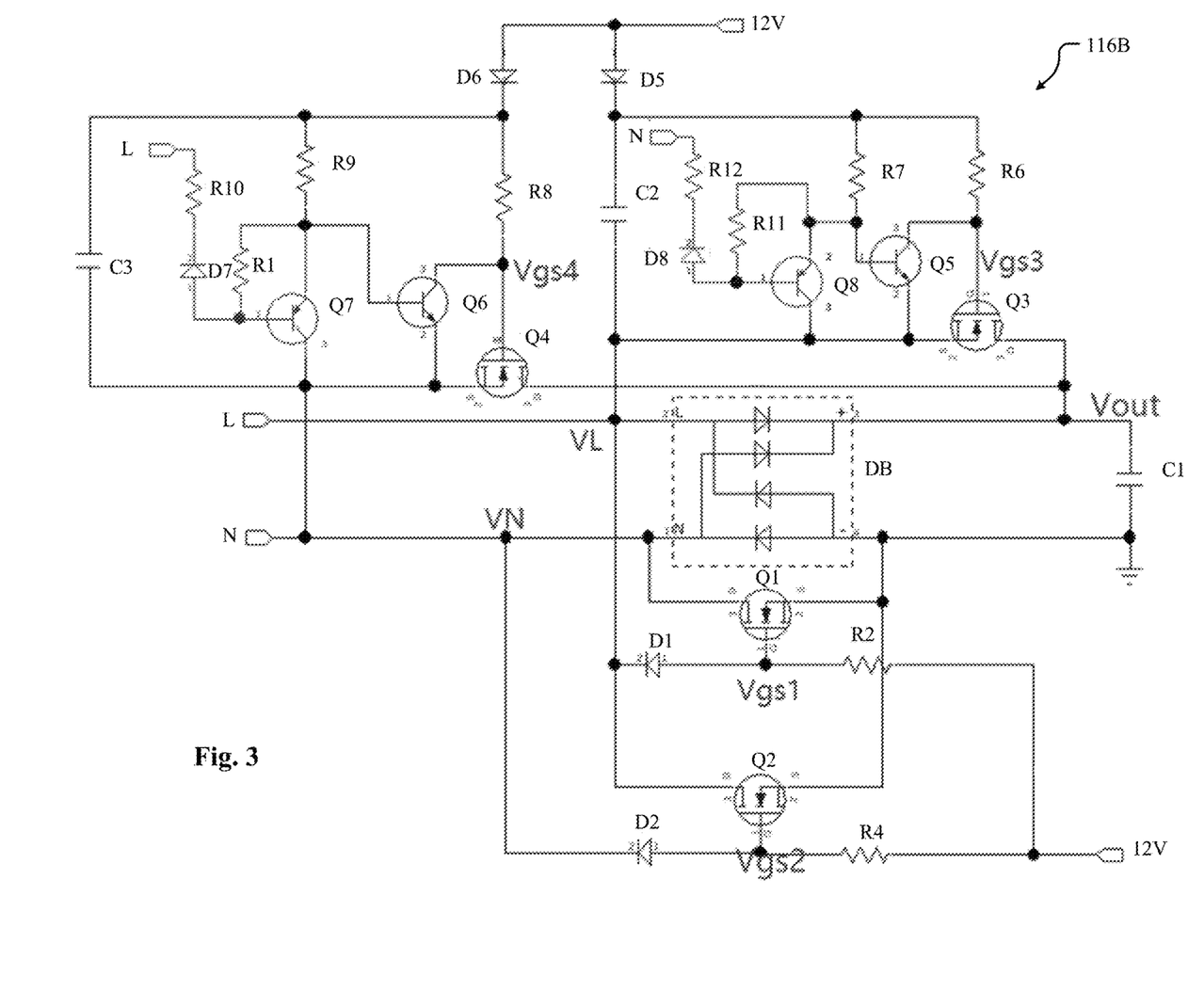
FIG. 3 illustrates a schematic with example circuitry for the rectifier in FIG. 1 according to at least one example embodiment.

FIG. 3 illustrates a schematic with example circuitry for the rectifier in FIG. 1 according to at least one example embodiment. FIG. 3 includes many of the same elements as FIG. 2, and thus, a description of these elements is not repeated here. In at least one example embodiment of FIG. 3, first through fourth circuit portions mentioned above in the discussion of FIG. 2 are considered to include circuit components that are not part of the adjustment circuits discussed below. For example, in FIG. 3, the first circuit portion includes transistor Q1, diode D1, and resistor R2, the second circuit portion includes transistor Q2, diode D2, and resistor R4, the third circuit portion includes transistors Q3 and Q5, resistors R7 and R6, capacitor C2, an diode D5, and the fourth circuit portion includes transistors Q4 and Q6, resistors R8 and R9, capacitor C3, and diode D6.

Notably, the rectifier 116B in FIG. 3 shows different example circuitry for the first and second adjustment circuits described in FIG. 2. For example, the optocouplers OC1 and OC2 from FIG. 2 are removed and replaced by first and second adjustments circuits as described in more detail below.

In FIG. 3, the first adjustment circuit includes a first voltage divider circuit coupled to a transistor Q8 and the second input N, and an output of the transistor Q8 (e.g., the emitter) is coupled to the third transistor Q3. For example, the output of the transistor Q8 is coupled to a source of the third transistor Q3. The first voltage divider circuit includes a resistance R12 in series with a resistance R11, and a gate of the transistor Q8 is coupled to a node between the resistance R12 and the resistance R11. As shown, the first voltage divider circuit further includes a diode D8 coupled between the resistance R12 and the resistance R11. The resistance R12 is coupled between the second input N and the diode D8.

In FIG. 3, the second adjustment circuit includes a second voltage divider circuit coupled to a transistor Q7 and the first input L, and an output (e.g., emitter) of the transistor Q7 is coupled to the fourth transistor Q4. For example, the output of the transistor Q7 is coupled to a source of the fourth transistor Q4. As shown, the second voltage divider circuit further includes a resistance R10 in series with a resistance R1, and a gate of the transistor Q7 is coupled to a node between the resistance R10 and the resistance R1. The second voltage divider circuit further includes a diode D7 coupled between the resistance R10 and the resistance R1, and the resistance R10 is coupled between the first input L and the diode D7.

As may be appreciated from FIG. 3, the on/off status of transistors Q7 and Q8 depends on the polarity and level (or amplitude) of the signal at inputs L and N. Thus, the values of resistances R1 and R10 may be adjusted to achieve a suitable turn on threshold voltage for transistor Q7, while the values of resistances R11 and R12 may be adjusted to achieve a suitable turn on threshold voltage for transistor Q8. As a result, a deadtime between on-states of transistors Q3 and Q4 is adjustable based on the values of resistances R1, R10, R11, and R12 (i.e., points at which gate-source voltages Vgs3 and Vgs4 rise and fall are adjustable). Thus, the values of resistances R1, R10, R11, and R12 are selected as design parameters based on empirical evidence and/or preference. Although not explicitly shown, it should be appreciated that the resistances R1, R10, R11, and R12, as well as other resistances in FIGS. 2-4, may be implemented with variable resistors (e.g., potentiometers) that have adjustable resistances in order to allow for adjustment of circuit parameters depending on the application.

Figure 4:
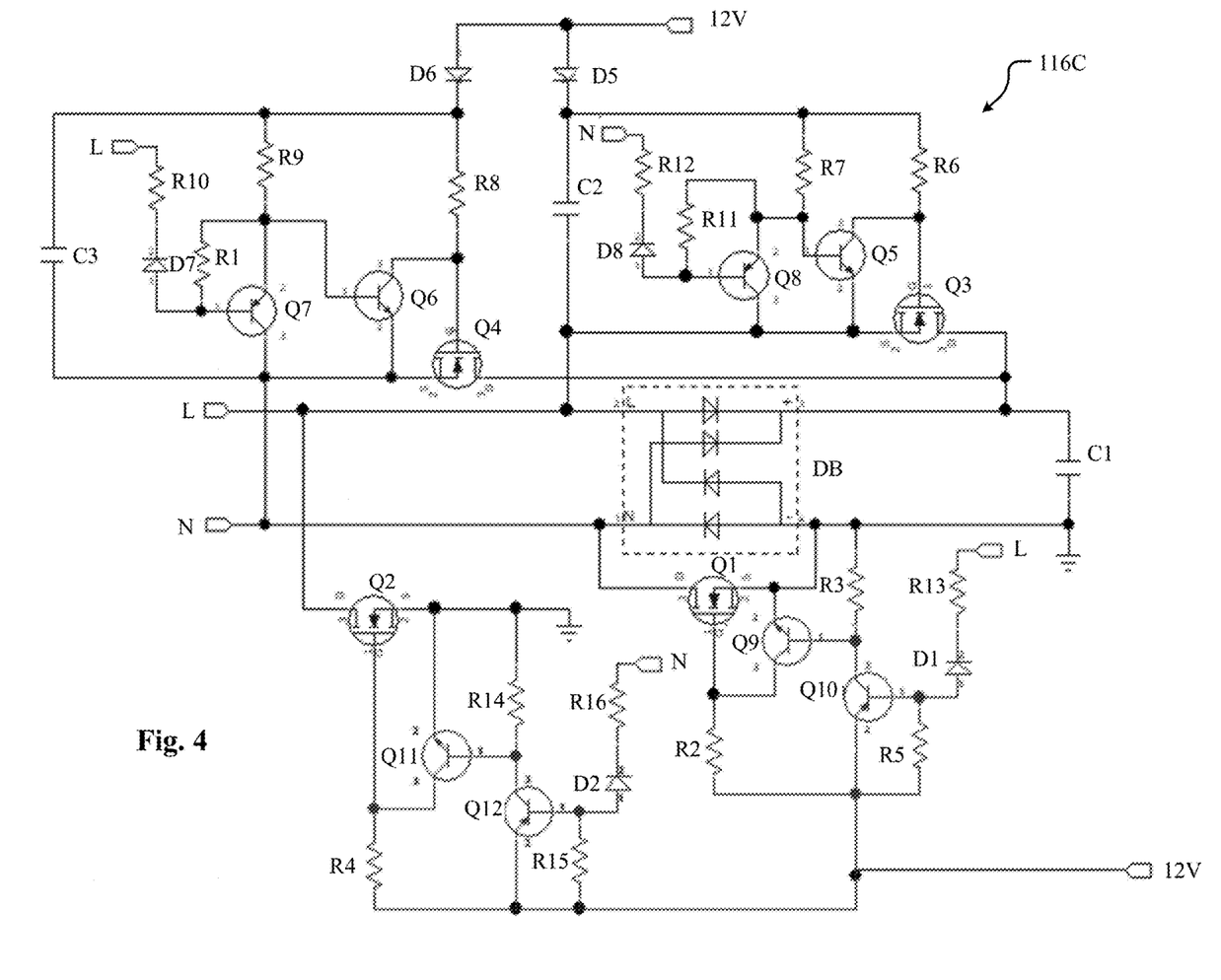
FIG. 4 illustrates a schematic with example circuitry for the rectifier in FIG. 1 according to at least one example embodiment.

FIG. 4 illustrates a schematic with example circuitry for the rectifier in FIG. 1 according to at least one example embodiment. FIG. 4 includes many of the same elements as FIGS. 2 and 3, and thus, a description of these elements is not repeated here. Notably, the rectifier 116C shows the same example circuitry for the first and second adjustment circuits described in FIG. 3 for rectifier 116B. In FIG. 4, however, adjustment circuits are included for transistors Q1 and Q2. For example, a third adjustment circuit is coupled to the first transistor Q1, and a fourth adjustment circuit is coupled to the second transistor Q2.

In more detail, the third adjustment circuit is coupled to a gate of the first transistor Q1, and the fourth adjustment circuit is coupled to a gate of the second transistor Q2. Similar to the first and second adjustment circuits that control a dead time between on-states of transistors Q3 and Q4, the third adjustment circuit and the fourth adjustment circuit are configured to control a dead time between an on-state of the first transistor Q1 and an on-state of the second transistor Q2 based on values of resistances R5, R13, R15, and R16.

As can be appreciated from FIG. 4, the first circuit portion coupled to the first transistor Q1 and the second circuit portion coupled to the second transistor Q2 include circuit components that are identical to circuit components of the third and fourth circuit portions described above with reference to FIG. 3. That is, the first circuit portion includes transistors Q1, resistors R2 and R3, and switch Q9, and the second circuit portion includes transistor Q2, resistors R4 and R14, and switch Q11.

Furthermore, the first, second, third, and fourth adjustment circuits each include an identical group of circuit components coupled to a respective one of the first, second, third, and fourth circuit portions. As can be appreciated from FIG. 4, the identical group of circuit components includes two resistances, a diode connected between the two resistances, and a transistor including a gate coupled to a node between the diode and one of the resistance. For each adjustment circuit, values of the two resistances control the dead time between the on-states of the third and fourth transistors Q3 and Q4 and the dead time between on-states of the first and second transistors Q1 and Q2.

It should be understood that although each first through fourth circuit portion and each adjustment circuit in FIG. 4 have identical groups of circuit components, the values and/or characteristics of the circuit components may be the same or different across the groups according to design preferences. For example, the first through fourth adjustment circuits each include two resistors, a diode, and a transistor, but values of the resistors and/or properties of the diode and transistor may be the same for each adjustment circuit or may vary for each adjustment circuit depending on design preferences.

FIGS. 2-4 illustrate various circuit components used for implementing a rectifier that has automatic and/or adjustable dead time control. It should be appreciated that various elements of the designs in FIGS. 2-4 can be combined or omitted according to design preferences. In general, however, the first and second adjustment circuits should be used together and the third and fourth adjustment circuits should be used together. It should further be appreciated that more or fewer or different circuit components may be used according to design preferences and are within the scope of inventive concepts. Additionally, it should be appreciated that although inventive concepts have been illustrated and described with respect to single-phase, full wave rectification, inventive concepts may also be applied to other types of rectification in accordance with the knowledge of one skilled in the art (e.g., three-phase rectification).

Figure 5:
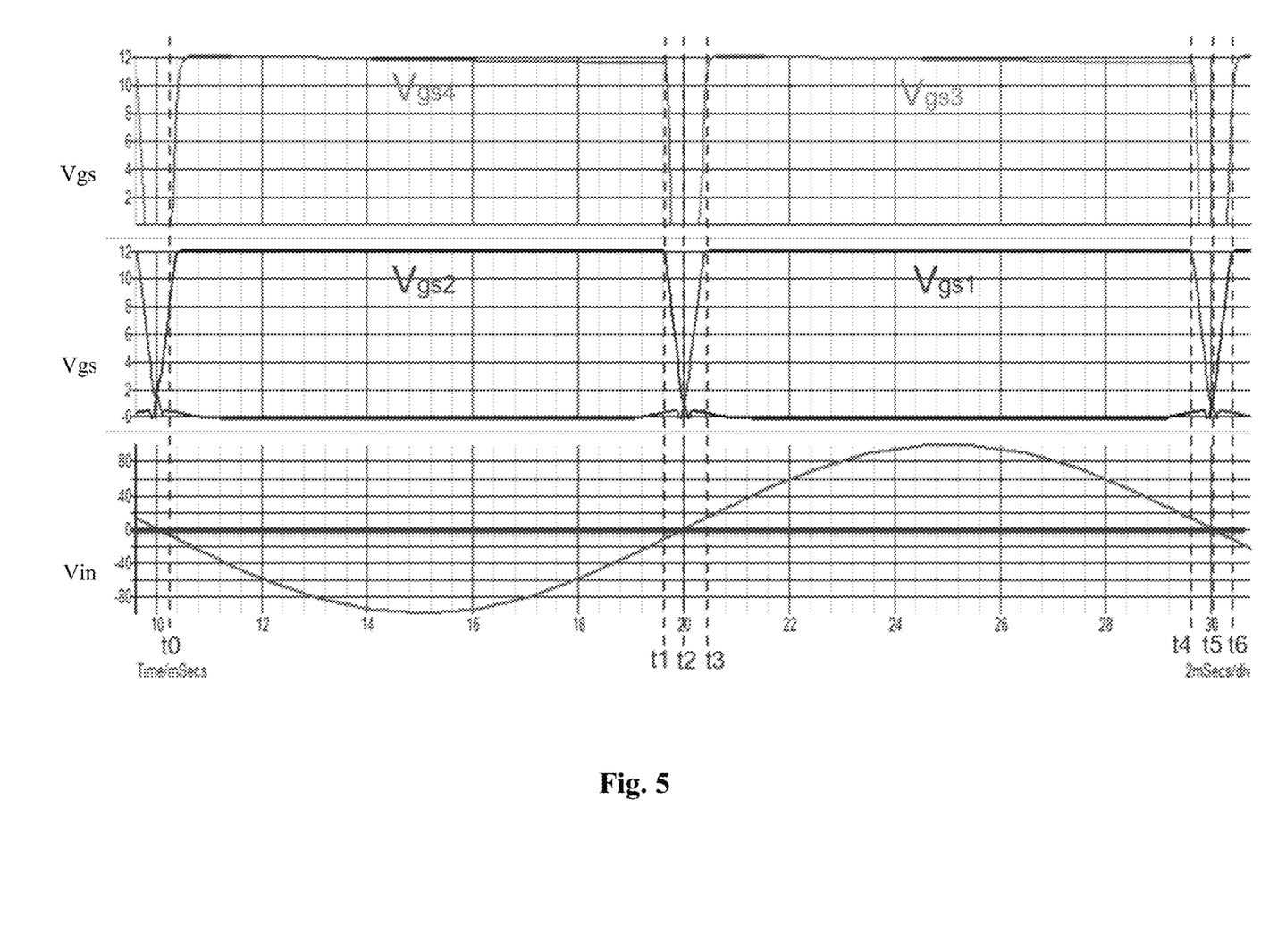
FIG. 5 illustrates an example simulation for a rectifier according to at least one example embodiment.

FIG. 5 illustrates an example simulation for a rectifier according to at least one example embodiment. For example, FIG. 5 illustrates a simulation showing an input signal Vin input to inputs L and N and corresponding gate-source voltages Vgs1 to Vgs4 for one or more of the designs in FIGS. 2-4. As shown in FIG. 5, the circuit designs of FIGS. 2-4 create a suitable deadtime between a time t1 when Vgs4 passes a threshold and starts to fall to 0V and a time t3 when Vgs3 passes the threshold while rising to peak amplitude (e.g., about 12V). The rise and fall thresholds may be selected based on empirical evidence and/or preference, and may be the same or different according to design preferences. As shown, another dead time exists between time t4 and time t6. These dead times may be adjusted in accordance with example embodiments discussed above. Times t2 and t5 are times at which both Vgs3 and Vgs4 remain low or at 0V, and time t0 illustrates a time when Vgs4 begins to rise toward peak amplitude. In FIG. 5, the dead time between Vgs1 and Vgs2 is about the same as the dead time between Vgs3 and Vgs4. However, the dead time between Vgs1 and Vgs2 may be adjusted with the design of FIG. 4. Thus, the dead time between Vgs1 and Vgs2 and the dead time between Vgs3 and Vgs4 may be different according to design preferences.

Said another way in terms of the circuit design from FIG. 2, when Vgs1 is less than 12V (or other voltage of the design), control current passes through optocoupler OC1 and Vgs3 is pulled down at time t4. On the other hand, when Vgs2 is less than 12V (or other voltage of the design), control current passes through optocoupler OC2 and Vgs4 is pulled down at time t1 (or t4).

Figure 6:
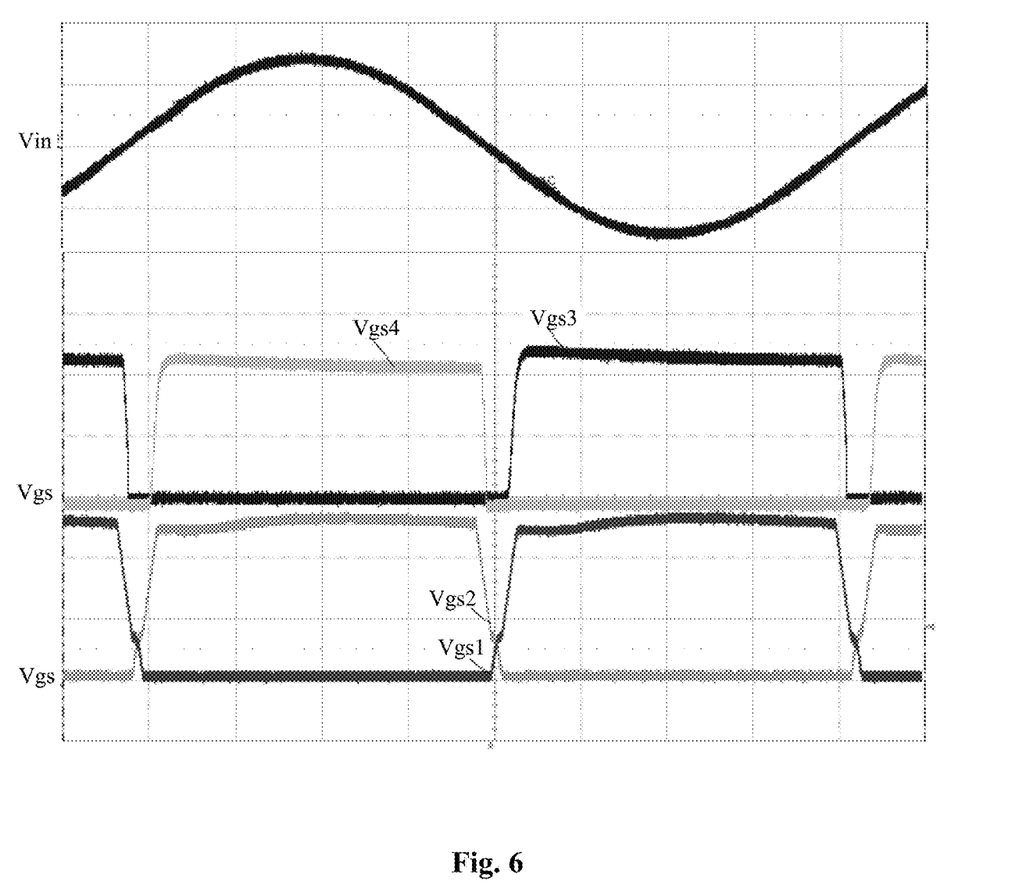
FIG. 6 illustrates an example test result for a rectifier according to at least one example embodiment.

FIG. 6 illustrates an example test result for a rectifier according to at least one example embodiment. For example, FIG. 6 illustrates a simulation showing an input signal Vin input to inputs L and N and corresponding gate-source voltages Vgs1 to Vgs4 for one or more of the designs in FIGS. 2-4. As in FIG. 5, FIG. 6 illustrates a deadtime between Vgs4 and Vgs3, which is controllable using the rectifier designs in FIGS. 2-4.

Here, it should be appreciated that a same or similar dead time shown in FIGS. 5 and 6 between Vgs3 and Vgs4 may additionally or alternatively be generated between Vgs1 and Vgs2 if desired, for example, using the rectifier design 116C of FIG. 4 that shows additional adjustment circuits for transistors Q1 and Q2.

In view of foregoing description, it should be appreciated that example embodiments provide automatic and adjustable dead time control for rectifiers while maintaining high efficiency and improved reliability. Additionally, rectifiers according to example embodiments are implemented with relatively few components and do not utilize external control signals, thereby further improving reliability and reducing cost. Still further, the adjustable dead time and mitigation of short circuits for rectifiers according to example embodiments achieve improved iTHD and EMI performance.

At least one example embodiment is directed to a rectifier including a first input and a second input that receive an unrectified signal, a first circuit portion including a first transistor coupled to the second input, a second circuit portion including a second transistor coupled to the first input, a third circuit portion including a third transistor coupled to the first input, a fourth circuit portion including a fourth transistor coupled to the second input. The first, second, third, and fourth circuit portions are operable to convert the unrectified signal into a rectified signal. the rectifier includes a first adjustment circuit coupled to a gate of the third transistor, and a second adjustment circuit coupled to a gate of the fourth transistor. The first adjustment circuit and the second adjustment circuit are configured to control a dead time between an on-state of the third transistor and an on-state of the fourth transistor.

According to at least one example embodiment, the first adjustment circuit includes a first optocoupler including a first light emitting portion coupled to the first transistor and a first light receiving portion coupled to the third transistor.

According to at least one example embodiment, the second adjustment circuit includes a second optocoupler including a second light emitting portion coupled to the second transistor and a second light receiving portion coupled to the fourth transistor.

According to at least one example embodiment, the first light emitting portion is coupled between a power supply node that receives a power supply signal and a gate of the first transistor, and the first light receiving portion is coupled between the first input and the gate of the third transistor.

According to at least one example embodiment, the second light emitting portion is coupled between the power supply node and a gate of the second transistor, and the second light receiving portion is coupled between the second input and the gate of the fourth transistor.

According to at least one example embodiment, the first light receiving portion is coupled to a source of the third transistor, and the second light receiving portion is coupled to a source of the fourth transistor.

According to at least one example embodiment, the first adjustment circuit includes a first voltage divider circuit coupled to a fifth transistor and the second input, and an output of the fifth transistor is coupled to the third transistor.

According to at least one example embodiment, the output of the fifth transistor is coupled to a source of the third transistor.

According to at least one example embodiment, the first voltage divider circuit includes a first resistance in series with a second resistance, and a gate of the fifth transistor is coupled to a node between the first resistance and the second resistance.

According to at least one example embodiment, the first voltage divider circuit includes a diode coupled between the first resistance and the second resistance, and the first resistance is coupled between the second input and the diode.

According to at least one example embodiment, the second adjustment circuit includes a second voltage divider circuit coupled to a sixth transistor and the first input, and an output of the sixth transistor is coupled to the fourth transistor.

According to at least one example embodiment, the output of the sixth transistor is coupled to a source of the fourth transistor.

According to at least one example embodiment, the second voltage divider circuit includes a first resistance in series with a second resistance, and a gate of the sixth transistor is coupled to a node between the first resistance and the second resistance.

According to at least one example embodiment, the second voltage divider circuit includes a diode coupled between the first resistance and the second resistance, and the first resistance is coupled between the first input and the diode.

According to at least one example embodiment, the rectifier includes a third adjustment circuit coupled to a gate of the first transistor, and a fourth adjustment circuit coupled to a gate of the second transistor. The third adjustment circuit and the fourth adjustment circuit are configured to control a dead time between an on-state of the first transistor and an on-state of the second transistor.

According to at least one example embodiment, the first, second, third, and fourth adjustment circuits each include an identical group of circuit components coupled to a respective one of the first, second, third, and fourth circuit portions.

According to at least one example embodiment, the identical group of circuit components includes a first resistance, a second resistance, a diode connected between the first resistance and the second resistance, and a transistor including a gate coupled to a node between the diode and the second resistance.

According to at least one example embodiment, for each adjustment circuit, values of the first resistance and the second resistance control the dead time between the on-states of the third and fourth transistors and the dead time between on-states of the first and second transistors.

At least one example embodiment is directed to a load, and a power supply that supplies power to the load and including a rectifier. The rectifier includes a first input and a second input that receive an unrectified signal, a first circuit portion including a first transistor coupled to the second input, a second circuit portion including a second transistor coupled to the first input, a third circuit portion including a third transistor coupled to the first input, a fourth circuit portion including a fourth transistor coupled to the second input. The first, second, third, and fourth circuit portions are operable to convert the unrectified signal into a rectified signal. The rectifier includes a first adjustment circuit coupled to a gate of the third transistor, and a second adjustment circuit coupled to a gate of the fourth transistor. The first adjustment circuit and the second adjustment circuit are configured to control a dead time between an on-state of the third transistor and an on-state of the fourth transistor.

At least one example embodiment is directed to a system including a source that generates an alternating current (AC) signal, a load, and a power supply that supplies power to the load with a direct current (DC) signal. The power supply includes a rectifier. The rectifier includes a first input and a second input that receive the AC signal, a first circuit portion including a first transistor coupled to the second input, a second circuit portion including a second transistor coupled to the first input, a third circuit portion including a third transistor coupled to the first input, a fourth circuit portion including a fourth transistor coupled to the second input. The first, second, third, and fourth circuit portions are operable to convert the AC signal into the DC signal, a first adjustment circuit coupled to a gate of the third transistor, and a second adjustment circuit coupled to a gate of the fourth transistor. The first adjustment circuit and the second adjustment circuit are configured to control a dead time between an on-state of the third transistor and an on-state of the fourth transistor.

Any one or more of the aspects/embodiments as substantially disclosed herein.

Any one or more of the aspects/embodiments as substantially disclosed herein optionally in combination with any one or more other aspects/embodiments as substantially disclosed herein.

One or more means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

The terms "determine," "calculate," "compute," and variations thereof, as used herein, are used interchangeably and include any type of methodology, process, mathematical operation or technique.

What is claimed is:

1. A rectifier, comprising:
   a first input and a second input that receive an unrectified signal;
   a first circuit portion including a first transistor coupled to the second input;
   a second circuit portion including a second transistor coupled to the first input;
   a third circuit portion including a third transistor coupled to the first input;
   a fourth circuit portion including a fourth transistor coupled to the second input, wherein the first, second, third, and fourth circuit portions are operable to convert the unrectified signal into a rectified signal;
   a first adjustment circuit coupled to a gate of the third transistor; and
   a second adjustment circuit coupled to a gate of the fourth transistor, wherein the first adjustment circuit and the second adjustment circuit are configured to control a dead time between an on-state of the third transistor and an on-state of the fourth transistor,
   wherein the first adjustment circuit includes a first voltage divider circuit coupled to a fifth transistor and the second input,
   wherein an output of the fifth transistor is coupled to the third transistor,
   wherein the first voltage divider circuit includes a first resistance in series with a second resistance, and
   wherein a gate of the fifth transistor is coupled to a node between the first resistance and the second resistance.

2. The rectifier of claim 1, wherein the first adjustment circuit includes a first optocoupler including a first light emitting portion coupled to a gate of the first transistor and a first light receiving portion coupled to the gate of the third transistor.

3. The rectifier of claim 2, wherein the second adjustment circuit includes a second optocoupler including a second light emitting portion coupled to a gate of the second transistor and a second light receiving portion coupled to the gate of the fourth transistor.

4. The rectifier of claim 3, wherein the first light emitting portion is coupled between a power supply node that receives a power supply signal and the gate of the first transistor, and wherein the first light receiving portion is coupled between the first input and the gate of the third transistor.

5. The rectifier of claim 4, wherein the second light emitting portion is coupled between the power supply node and the gate of the second transistor, and wherein the second light receiving portion is coupled between the second input and the gate of the fourth transistor.

6. The rectifier of claim 5, wherein the first light receiving portion is coupled to a source of the third transistor, and wherein the second light receiving portion is coupled to a source of the fourth transistor.

7. The rectifier of claim 1, further comprising:
   a third adjustment circuit coupled to a gate of the first transistor; and
   a fourth adjustment circuit coupled to a gate of the second transistor, wherein the third adjustment circuit and the fourth adjustment circuit are configured to control a dead time between an on-state of the first transistor and an on-state of the second transistor.

8. The rectifier of claim 7, wherein the first, second, third, and fourth adjustment circuits each include an identical group of circuit components coupled to a respective one of the first, second, third, and fourth circuit portions.

9. The rectifier of claim 8, wherein the identical group of circuit components includes a third resistance, a fourth resistance, a diode connected between the third resistance and the fourth resistance, and a transistor including a gate coupled to a node between the diode and the fourth resistance.

10. The rectifier of claim 1, wherein the output of the fifth transistor is coupled to a source of the third transistor.

11. The rectifier of claim 1, wherein the second adjustment circuit includes a second voltage divider circuit coupled to a sixth transistor and the first input, and wherein an output of the sixth transistor is coupled to the fourth transistor.

12. The rectifier of claim 11, wherein the output of the sixth transistor is coupled to a source of the fourth transistor.

13. The rectifier of claim 11, wherein the second voltage divider circuit includes a third resistance in series with a fourth resistance, and wherein a gate of the sixth transistor is coupled to a node between the third resistance and the fourth resistance.

14. The rectifier of claim 13, wherein the second voltage divider circuit includes a diode coupled between the third resistance and the fourth resistance, and wherein the third resistance is coupled between the first input and the diode.

15. The rectifier of claim 9, wherein, for each adjustment circuit, values of the third resistance and the fourth resistance control the dead time between the on-states of the third and fourth transistors and the dead time between on-states of the first and second transistors.

16. A device, comprising:
    a load; and a power supply that supplies power to the load with a rectified signal, the power supply including a rectifier including:
  a first input and a second input that receive an unrectified signal;
  a first circuit portion including a first transistor coupled to the second input;
  a second circuit portion including a second transistor coupled to the first input;
  a third circuit portion including a third transistor coupled to the first input;
  a fourth circuit portion including a fourth transistor coupled to the second input, wherein the first, second, third, and fourth circuit portions are operable to convert the unrectified signal into the rectified signal;
  a first adjustment circuit coupled to a gate of the third transistor;
  a second adjustment circuit coupled to a gate of the fourth transistor, wherein the first adjustment circuit and the second adjustment circuit are configured to control a dead time between an on-state of the third transistor and an on-state of the fourth transistor;
  a third adjustment circuit coupled to a gate of the first transistor; and
  a fourth adjustment circuit coupled to a gate of the second transistor,
wherein the third adjustment circuit and the fourth adjustment circuit are configured to control a dead time between an on-state of the first transistor and an on-state of the second transistor,
wherein the first, second, third, and fourth adjustment circuits each include an identical group of circuit components coupled to a respective one of the first, second, third, and fourth circuit portions, and
wherein the identical group of circuit components includes a first resistance, a second resistance, a diode connected between the first resistance and the second resistance, and a transistor including a gate coupled to a node between the diode and the second resistance.

17. The rectifier of claim 1, wherein the first voltage divider circuit includes a diode coupled between the first resistance and the second resistance, and wherein the first resistance is coupled between the second input and the diode.

18. A system, comprising:
  a source that generates an alternating current (AC) signal;
  a load; and
  a power supply that supplies power to the load with a direct current (DC) signal, the power supply including a rectifier including:
    a first input and a second input that receive the AC signal;
    a first circuit portion including a first transistor coupled to the second input;
    a second circuit portion including a second transistor coupled to the first input;
    a third circuit portion including a third transistor coupled to the first input;
    a fourth circuit portion including a fourth transistor coupled to the second input, wherein the first, second, third, and fourth circuit portions are operable to convert the AC signal into the DC signal;
    a first adjustment circuit coupled to a gate of the third transistor; and
    a second adjustment circuit coupled to a gate of the fourth transistor, wherein the first adjustment circuit and the second adjustment circuit are configured to control a dead time between an on-state of the third transistor and an on-state of the fourth transistor,
  wherein the first adjustment circuit includes a first voltage divider circuit coupled to a fifth transistor and the second input,
  wherein an output of the fifth transistor is coupled to the third transistor, wherein the first voltage divider circuit includes a first resistance in series with a second resistance, and
  wherein a gate of the fifth transistor is coupled to a node between the first resistance and the second resistance.

* * * * *